United States Patent [19]

Hubred et al.

[11] 4,222,832
[45] Sep. 16, 1980

[54] CASCADING ELECTROLYTE BLEED STREAMS

[75] Inventors: Gale L. Hubred, Irvine, Calif.; Edwin L. Owen, San Antonio, Tex.

[73] Assignee: Kennecott Copper Corporation, New York, N.Y.

[21] Appl. No.: 36,332

[22] Filed: May 7, 1979

[51] Int. Cl.² .................... C25C 1/08; C25C 1/12; C22B 3/00
[52] U.S. Cl. ...................... 204/106; 75/101 BE; 204/112; 423/24; 423/139
[58] Field of Search ............... 204/106, 107, 108, 112, 204/113; 423/24, 139; 75/101 BE, 117, 119

[56] References Cited

U.S. PATENT DOCUMENTS

| | | | |
|---|---|---|---|
| 3,855,090 | 12/1974 | Skarbo | 204/106 |
| 4,012,482 | 3/1977 | Natwig | 423/24 |
| 4,043,882 | 8/1977 | Skarbo | 423/24 |

Primary Examiner—T. M. Tufariello
Attorney, Agent, or Firm—John L. Sniado; Anthony M. Lorusso

[57] ABSTRACT

A system of multiple extraction in which each of the metal elements extracted is bonded to the extractant with a different degree of intensity. To reduce impurities in each metal recovery stage, a bleed stream from each recovery stage is cascaded backwards. In general, the backward cascade disposes of the bleed stream from the most tightly bonded species by recycling it to any preceeding stage of a less tightly bonded species.

An example of a process for recovering copper and nickel from an aqueous leach solution containing these values is given. In this type of process, ammonia, copper and nickel are first coextracted onto an organic extractant (oxime). Ammonia is stripped first. In a nickel recovery circuit, nickel values are selectively stripped from the oxime with acid, pure nickel is electrowon, and the acidic, nickel-barren raffinate from the electrowinning cell is recirculated. Downstream of the nickel recovery circuit, in a copper recovery circuit, copper is stripped from the oxime with acid, metal is electrowon from the acid, and metal-barren acid is recirculated. Nickel and other metallic impurities build up in the copper recovery circuit, and impurities build up in the nickel recovery circuit. To overcome this problem, bleed streams are taken from both circuits and fed to any preceding stage including the metal extraction stage. Because of the property of the extractant to extract both copper and nickel, the metal values in this directed stream eventually get re-extracted.

8 Claims, 7 Drawing Figures

CASCADING ELECTROLYTE BLEED STREAMS

BACKGROUND OF THE INVENTION

This invention relates to extraction processes in which two or more elements or compounds are co-extracted with a different degree of intensity. It also relates to an improvement in processes for recovering pure copper and pure nickel from aqueous leach liquors containing these values and at least trace concentrations of metallic impurities.

Aqueous, typically ammoniacal leach liquors containing retrievable quantities of copper and nickel often also contain at least trace amounts of cobalt and molybdenum as well as other metallic impurities such as alkali metal ions. Such liquors may be obtained, for example, by processing manganese nodules with hydrometallurgical techniques or by in-situ mining techniques. A typical source of a leach liquor (pregnant liquor) which contains copper, nickel and other values is set forth in U.S. Pat. No. 3,983,017 to Lester Szabo entitled "Recovery of Metal Values From Manganese Deep Sea Nodules Using Ammoniacal Cuprous Leach Solutions", the teaching of which are incorporated herein by reference.

A process by which copper metal and nickel metal may be recovered from such a solution is disclosed in detail in U.S. Pat. No. 3,855,090 to R. R. Skarbo (Dec. 17, 1974), the disclosure of which also is incorporated herein by reference. The process of the Skarbo patent may be understood with reference to FIG. 1 of the drawing of this application. In the copper and nickel extraction stage 2, a typically ammoniacal pregnant leach liquor enters at 1 and exits at 3 with a depleted nickel and copper content. The nickel and copper and some ammonia is taken up by an organic phase solubilized extractant such as an oxime which enters stage 2 at 4 and exits as a nickel and copper loaded organic stream 5. In addition to copper and nickel, the oxime in stream 5 inevitably contains small but (as will be explained below) significant quantities of impurities. The organic phase oxime is then scrubbed of ammonia at stage 6, and a substantially ammonia-free copper and nickel loaded oxime solution enters the nickel recovery circuit 7 via stream 8. Of course, if the oxime contains no ammonia, such as when a leach solution other than an ammoniacal solution is employed in the extraction stage, the scrub stage 6 can be eliminated.

In nickel recovery circuit 7, the metal loaded oxime stream is contacted in a plurality of stages 10, 11, 12, 13, 14 and 15 in countercurrent flow with a metal-barren acid stream 16. Selective nickel stripping (to the substantial exclusion of copper) is effected by maintaining the mole ratio of the hydrogen ions in the fresh aqueous acid to exchangable nickel ion in the fresh organic stream between about 1.8 and 1.2. The pH of the loaded acid stream 23 is maintained between about 1 and 4. Optimally, the temperature should be between about 40° C. and 55° C. Nickel is recovered from loaded stream 23 in nickel electrowinning stage 30 from which the substantially nickel-barren aqueous stream 16 is collected and recycled to stripping stage 15.

Organic stream 29 loaded with copper exits from stage 15 and is directed to a copper recovery circuit 9. In this circuit, the organic phase is stripped of metal (copper) in stage 32 by acid under conditions of pH and volumetric ratio of organic stream to aqueous stream to exchange hydrogen ions of the acid with copper ions bound by the oxime. From stage 32, an acidic copper-rich liquor exits the stripping stage at 34. Copper is electrowon in stage 35. The now copper and nickel barren organic stream exits the copper stripping stage via line 36 and may be recycled (as stream 4).

From the foregoing description it will be appreciated that nickel recovery circuit 7 and copper recovery circuit 9 produce nickel and copper cathodes. Impurities necessarily build up in these circuits. Thus, trace impurities taken up by the extractant and subsequently stripped collect in both recovery circuits 7 and 9. Thus, impurities can reach levels high enough to contaminate the cathodes or interfere with their production. Furthermore, the nickel stripping in circuit 7 is not complete, and small concentrations of nickel are stripped together with the copper in circuit 9. Since copper is won in stage 35, nickel concentration increases in this stage as electrowinning proceeds. Generally, the nickel ion concentration in copper recovery circuit 9 should not go above about 20 g/l.

A prior art technique for overcoming the problems of impurity buildup simply was to take a bleed stream from each circuit, typically from the downstream side of the electrowinning cells as is shown in FIG. 2. In addition to impurities, the bleed streams contain finite amounts of valuable copper and nickel and other reagents which were lost. Furthermore, various precipitation techniques were required before the bleed streams could be discarded, and these techniques involved ongoing material costs and an investment in original equipment.

In accordance with the Skarbo patent (FIG. 1), a partial solution to this problem was provided by furnishing a cross-over bleed stream 38 from the downstream side of the copper electro-winning stage 35 in circuit 9 to the downstream side of nickel electrowinning state 30 in circuit 7. The provision of such a bleed stream enabled the nickel concentration to be kept at tolerable levels in the copper recovery circuit and optimize nickel recovery. However, various impurities nevertheless built up at least in circuit 7, and a bleed stream 43 and purification system with attendant costs was nevertheless required.

SUMMARY OF THE INVENTION

In accordance with the present invention there is provided a simple bleed stream purification process for electrolyte derived from liquid ion exchange extractions of the type in which two or more elements or compounds are held in an extractant with a different degree of intensity. The process is characterized by significant savings in capital costs and the ability to handle a wide variety of different impurities. The process of the invention utilizes the extraction properties of the extractants to take up the metal values which would otherwise collect in the recovery circuits. In accordance with one important aspect of the invention, the buildup of nickel in the copper recovery circuit and the buildup of impurities in both circuits are prevented by taking a bleed stream from both circuits and feeding the bleed stream solutions to a stage prior to the stages in which either metal is stripped such as the ammonia scrub stage or the extraction stage. The extraction properties of the extractant for copper and nickel prevents the buildup of impurities in the system beyond a predetermined level.

Thus, bleed stream solutions containing nickel, copper, ammonia and, for example, molybdenum, cobalt, one or more group IA or IIA metal ions, and various other impurities are taken from the metal recovery circuits at a rate such that the impurity concentrations do not exceed the levels required to maintain the purities of the electrowon cathodes. Instead of employing precipitation techniques and the like to treat the solutions, they are simply added to a stage prior to metal stripping where the copper and nickel are taken up again by the organic extractant. The bulk of other impurities is eventually ejected in the raffinate produced on extraction of the pregnant liquor. However, nickel and copper values in the bleed streams are recirculated through the purification cycle. Thus, advantage is taken of the extractants' ability to extractant copper and nickel.

Typically, the flow rate ratio of the copper and nickel rich pregnant liquor to the bleed stream solutions entering the stage or stages prior to the metal stripping stages is on the order of 100 to 1. Thus, the neutralization reaction which takes place between the acidic bleed stream and the typically ammoniacal liquor is not significant. It is desirable that bleed streams be taken from both the nickel and the copper recovery circuits. The copper bleed stream can be directed into the nickel recovery circuit. The nickel bleed circuit can be directed into the ammonia recovery circuit. Finally, the ammonia bleed stream can be directed to the extraction stage. This system also makes efficient use of the organic reagent.

It has also been discovered that there is an optimum temperature for stripping which lies within the range of 40°–55° C. It has been found advantageous to place a heat exchanger to maintain the loaded organic at this temperature within the organic loop so that heat exchange is performed prior to the organic stream entering the metal stripping circuit. In the case of in situ liquors, the heat exchanger would lower the temperature from about 70° to about 40°–55° C. In situ pregnant solutions typically have temperatures when they reach the surface of about 70° C.

In the event that it is desirable to divert acidic bleed streams to stages containing basic aqueous liquor in volumes greater than the 100:1 ratio indicated above, then neutralization of the bleed stream may be desirable. In one embodiment in the case of nickel and copper, the bleed stream from the nickel electrowinning circuit can be neutralized with sodium carbonate. The solid nickel carbonate produced can be then dissolved with acid from the bleed stream of the copper electrowinning. Excess acid from the copper electrowinning can be removed by precipitation with lime as gypsum.

An object of the invention is to provide a hydrometalurgical metal recovery process characterized by reduced capital costs and reagent expenditures.

Still another object of the invention is to take advantage of the selective extraction property of particular extractants to purify electrowinning bleed streams.

DESCRIPTION OF THE PREFERRED EMBODIMENT

Figure 4:
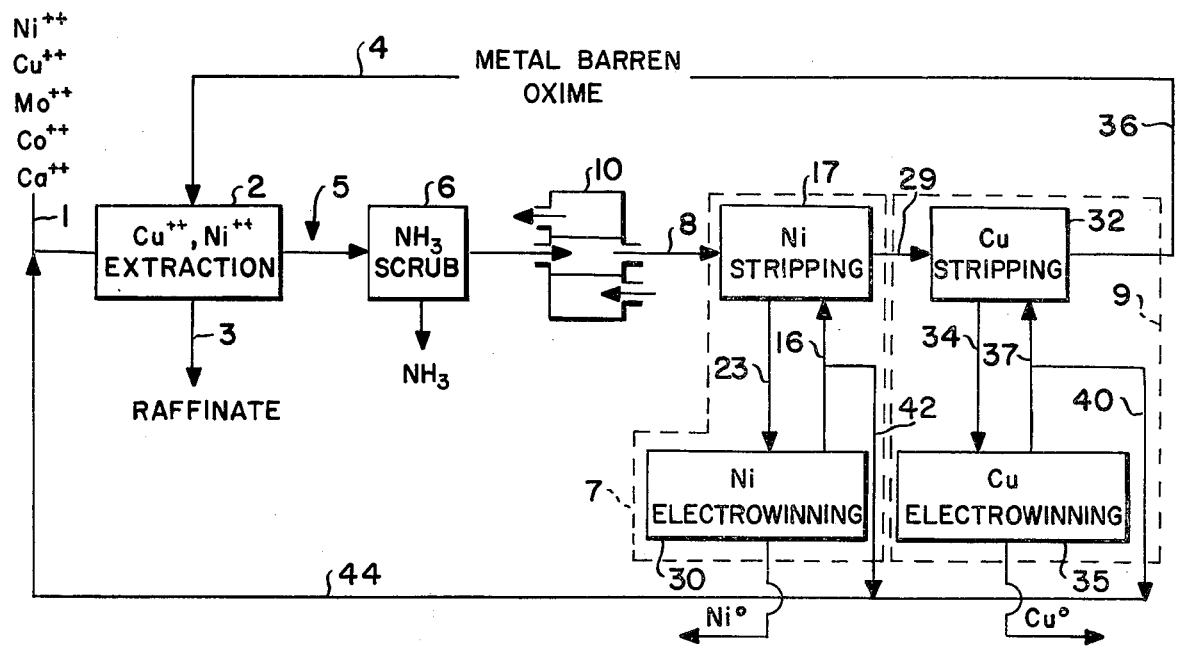
FIG. 4 is a schematic diagram illustrating an embodiment of the improved process of the invention.

Referring to FIG. 4, as in the prior art, an aqueous, typically ammoniacal leach liquor containing nickel and copper values as well as other metallic values or impurities, herein exemplified as cobalt, molybdenum, and calcium, is subjected to a copper and nickel coextraction in extraction stage 2 by being passed in countercurrent relation to a metal barren organic oxime or other extract which will coextract and selectively release copper and nickel or any other combination of metal values.

After scrubbing ammonia in stage 6 (if necessary), the loaded oxime is cooled (or heated) to the optimum temperature for stripping, typically 40° C.–55° C., in heat exchanger 10. This location for the heat exchanger has advantages, especially when, for example, the pregnant liquor to be treated is an in situ leach liquor. Such leach liquors typically are saturated or supersaturated with gypsum, and when obtained from deep lying ore bodies, may have a temperature at or above 70° C. Heat exchange with the pregnant liquor itself to lower its temperature can induce precipitation of gypsum and produce scaling problems. Furthermore, if heat exchange is performed on the pregnant liquor, equipment of higher capacity is needed than is the case with extractant cooling since the heat capacity of aqueous solutions is greater than that of organic solutions. Furthermore, there is more aqueous solution to cool.

It should be noted that the purpose of cooling is to maintain the temperature of the loaded organic at between 40°–55° C. because at this temperature stripping efficiency is increased. Thus, the temperature during the stripping reaction between the acid and the loaded extractant should be maintained between 40°–55° C. To maintain the organic extractant at this temperature, a typical shell and tube heat exchanger may be employed as heat exchanger 10. In the case of pregnant liquor from the cuprion process, it will be necessary to increase the temperature of the organic in order to have a stripping reaction temperature between the range of 40°–55° C. In this case, instead of a cooling fluid being introduced into the shell of the heat exchanger, a heating fluid is introduced into the shell and the organic is allowed to travel through the tubes.

Oxime extractants suitable for the process are disclosed, for example, in U.S. Pat. Nos. 3,224,873; 3,592,755; 3,455,680; 3,428,449; 3,276,863 and 3,197,274. The type of extractant used in the process selectively coextracts copper and nickel to the substantial exclusion of other metals under the conditions of the extraction. For details of such a process see U.S. Pat. No. 3,855,090 referred to above. However, certain impurities or other metal values are inevitably entrained, extracted, or otherwise delivered downstream in the process and are stripped in nickel recovery circuit 7 together with nickel values or in copper recovery circuit 9 along with the copper values. Within circuits 7 and 9 electrowinning is conducted such that, respectively, nickel and copper cathodes are produced.

The method of operating the electrowinning cells in this manner is well known in the art. The method requires that impurity levels in the electrolytes be maintained at or below certain levels, depending on the impurity involved and on other operational parameters of the electrowinning process.

Ions enter the respective stripping stages 17 and 32 in the acid from the electrowinning cells. In stripping stage 17, substantially only nickel is stripped from the oxime and solubilized in the acid. However, small amounts of impurities which inevitably are associated with the organic phase may also pass into the acid, and hydrogen ions pass from the acid to the organic phase to render it reusable. The impurity ions build up because the acid is continuously recycled as is shown by stream 23 and 16. In nickel electrowinning stage 30, nickel metal is deposited as a cathode and hydrogen ions are produced. Thus, there is a small but constant influx of impurities into the circuit, and the impurity concentration steadily increases until it interferes with the production of high quality nickel cathode.

The same phenomenon is observed in the copper recovery circuit. However, nickel may not be completely stripped in stage 17, and nickel values may enter copper stripping stage 32 on the extractant along with the copper. In circuit 9 the stripping is conducted such that copper and nickel ions (if present) are absorbed into the aqueous acid. As in nickel electrowinning stage 30, copper electrowinning stage 35 is operated such that substantially pure copper deposits as a cathode. Again, impurities, including nickel, build up in the circuit as the process continues.

In accordance with one aspect of the invention, bleed streams 40 and 42 are taken respectively from line 37 of circuit 9 and line 16 of circuit 7 and delivered, here as common line 44, to the copper and nickel extraction stage 2. Typically, the volume of the copper bleed stream 40 is about 0.5% to 1% of the volume of pregnant liquor entering extraction stage 2. Stream 42 has a typical volume of 0.1% to 0.4% of the total entering extraction stage 2. Thus, the volume ratio of the pregnant liquor to the combined bleed solutions is on the order of 100 to 1. Of course, make-up acid must be provided to both circuits.

Stream 44 (FIG. 4) contains nickel, copper, and various metallic impurities. In the prior art process, the manner in which the stream was treated depended on the nature of the impurities and the concentration of the various metallic species. Any such waste treatment necessarily consumed reagents and/or power and required a capital investment. Furthermore, different waste treatment systems are required if the nature of the impurities in the nickel and copper containing pregnant liquor varies. However, as can be appreciated from the foregoing, no additional equipment or reagents are needed for treatment of the type of bleed stream disclosed herein. Also, the nickel and copper values in the bleed stream, unlike the systems of the prior art, may be recovered without an expensive separate recovery system. Ultimately, impurities collected in the bleed stream are expelled with the raffinate exiting at 3. Thus, in effect, the system behaves as if the extractant picked up copper and nickel to the total exclusion of all other impurities. Once a tolerable steady-state impurity concentration has been reached in the recovery circuits, the only mass difference between the impurities entering extraction stage 2 and exiting at 3 is the very small amount (on the order of parts per million) of the metals which are electrodeposited together with the copper and nickel cathodes.

Figure 1:
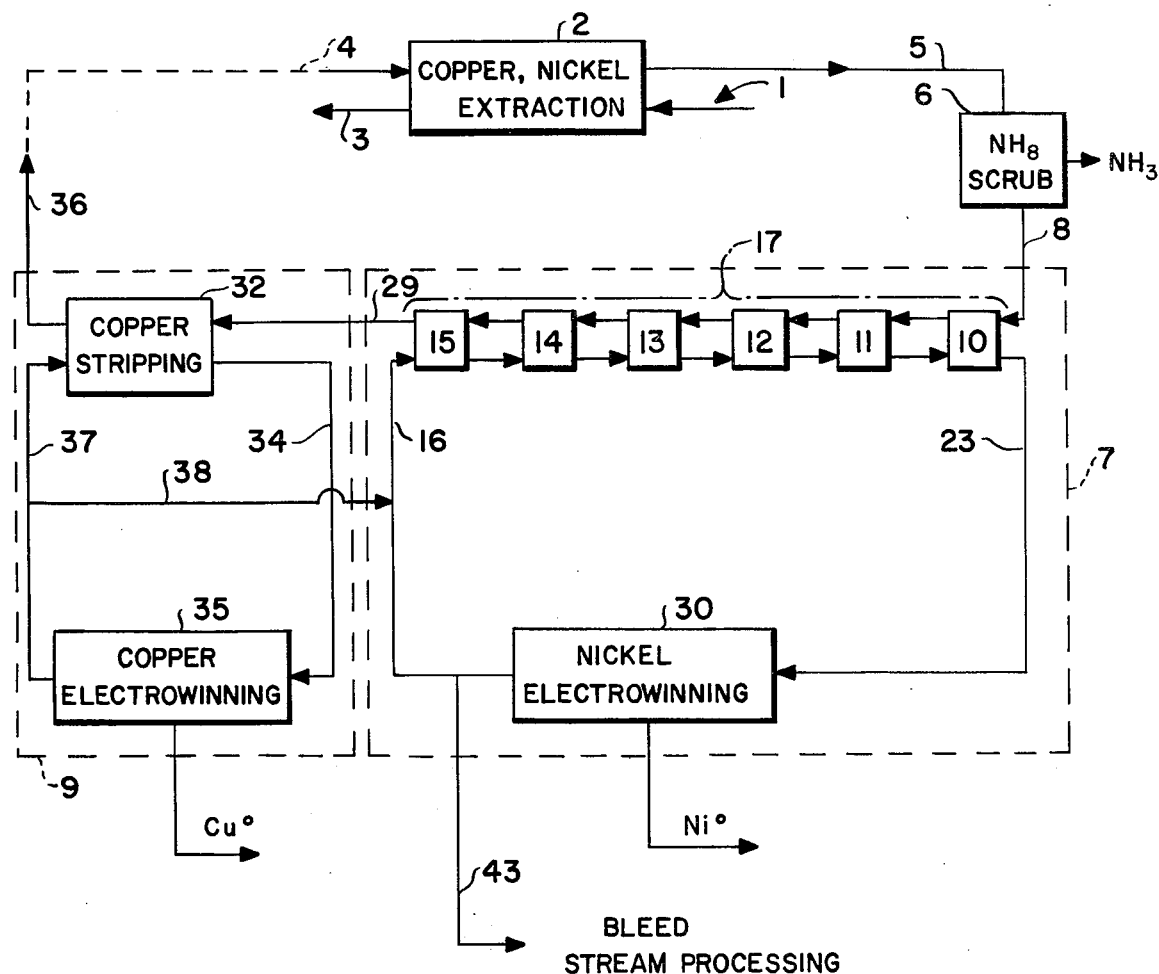
FIG. 1 is a schematic representation of a prior art copper and nickel recovery system.
Figure 2:
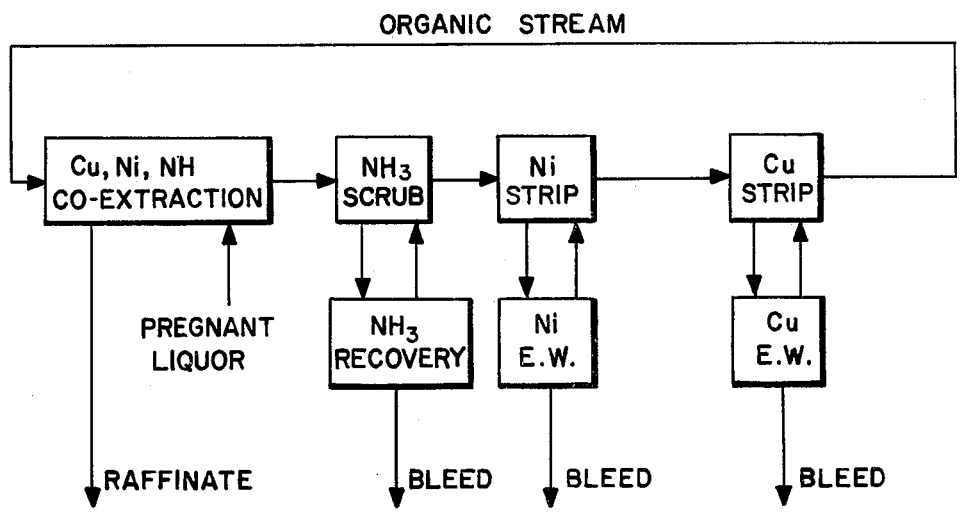
FIG. 2 is another schematic representation of a prior art copper and nickel recovery system.
Figure 5:
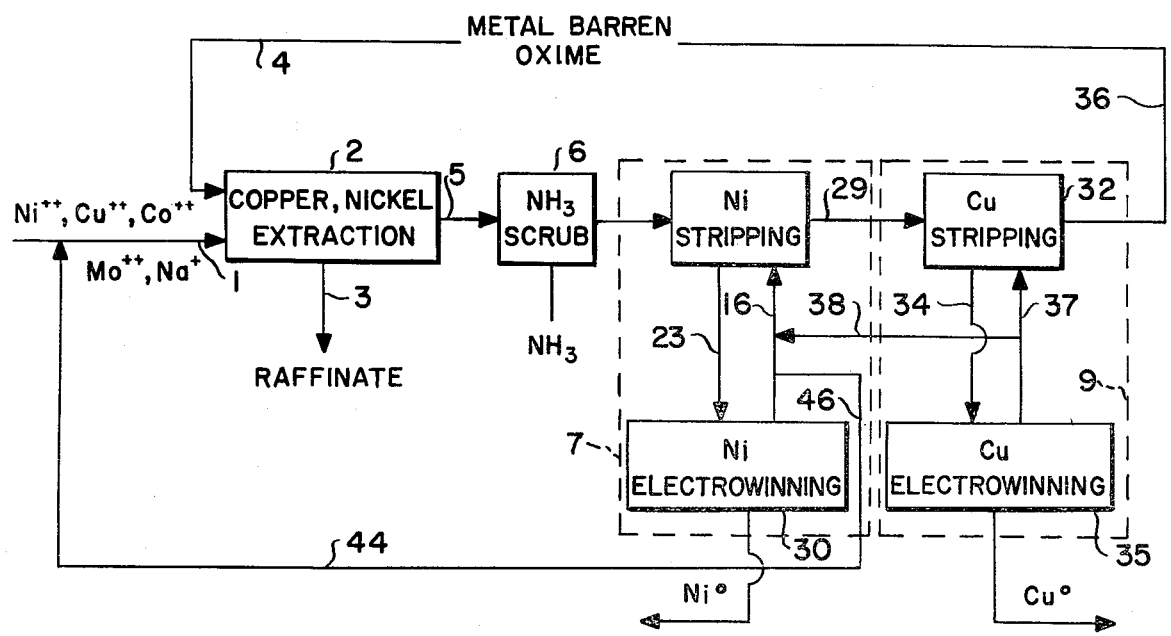
FIG. 5 is a schematic diagram illustrating another embodiment of the improved process of the invention.

Referring to FIG. 5, another embodiment of the invention is shown, its operation is identical to that of the embodiment shown in FIG. 4 except that heat exchanger 10 is omitted (for simplifying the figure) and instead of providing separate bleed streams from each of the metal recovery circuits 7 and 9 and feeding the combined bleed solutions to extraction stage 2, a cross-over bleed stream 38 is drawn off the downstream side of copper electrowinning apparatus 35 and delivered to the downstream side 16 of nickel electrowinning apparatus 30. Upstream of the point of entry of cross-over bleed stream 38, a bleed stream 46 is provided which, through conduit 44 and 1, is fed to copper and nickel extraction stage 2. The effect of this modification on the process of the invention is that the bleed solution in line 44 has a reduced nickel content as compared with the embodiment of FIG. 2. Thus, impurities including nickel that build up in the copper recovery circuit 9 are maintained at the selected low level as the bleed stream exits the circuit via cross-over bleed stream 38. As stream 38 enters the nickel recovery circuit, nickel values therein are combined with the nickel stripped from the extractant. The stream also introduces impurities. However, impurities are kept at tolerable levels by the bleed stream 46. The copper bleed stream going to the nickel circuit also provides make up acid for the nickel circuit. Make up acid would be required for the copper circuit.

As with the embodiment of FIG. 4, nickel and/or copper values solubilized in the bleed stream are extracted by the extractant in extraction stage 2 and impurities are ejected with the raffinate in stream 3.

Figure 3:
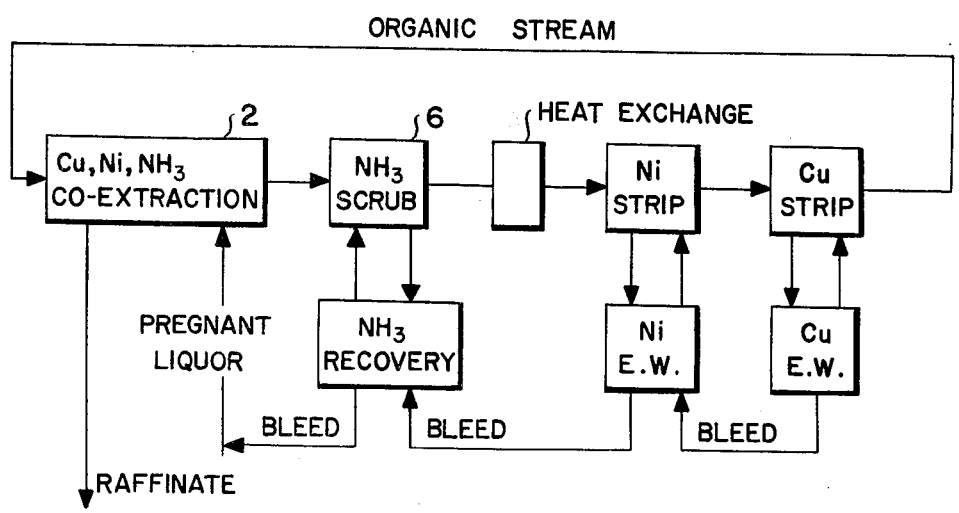
FIG. 3 is a simplified schematic diagram of the backward cascade in accordance with the present invention.

Another embodiment of the invention is shown in FIG. 3. In this embodiment the backwards cascade, not only reduces the build up of impurities but also provides the acid make-up requirements of the nickel electrowinning and ammonia scrub circuits. In this embodiment, a bleed stream is cascaded backwards from each strip stage to the preceeding stage. Thus the bleed from copper electrowinning is cascaded back to nickel electrowinning. The bleed from nickel electrowinning is cascaded back to the ammonia scrub and the bleed from ammonia scrub is cascaded back to the extraction stage. The volume of each bleed is about 0.1%–1% of the volume of the pregnant liquor stream.

A suitable scheme for scrubbing ammonia is set forth in U.S. Pat. No. 4,012,482 to Natwig et al. entitled "Scrubbing of Ammonia from Oxime Liquid Ion Exchange Reagents," the teachings of which are incorporated herein by reference. In that system, a primary and secondary scrub stage is disclosed. It is preferable to divert the bleed streams to the secondary scrub of that system since acid is used to adjust pH of the secondary scrub.

Figure 6:
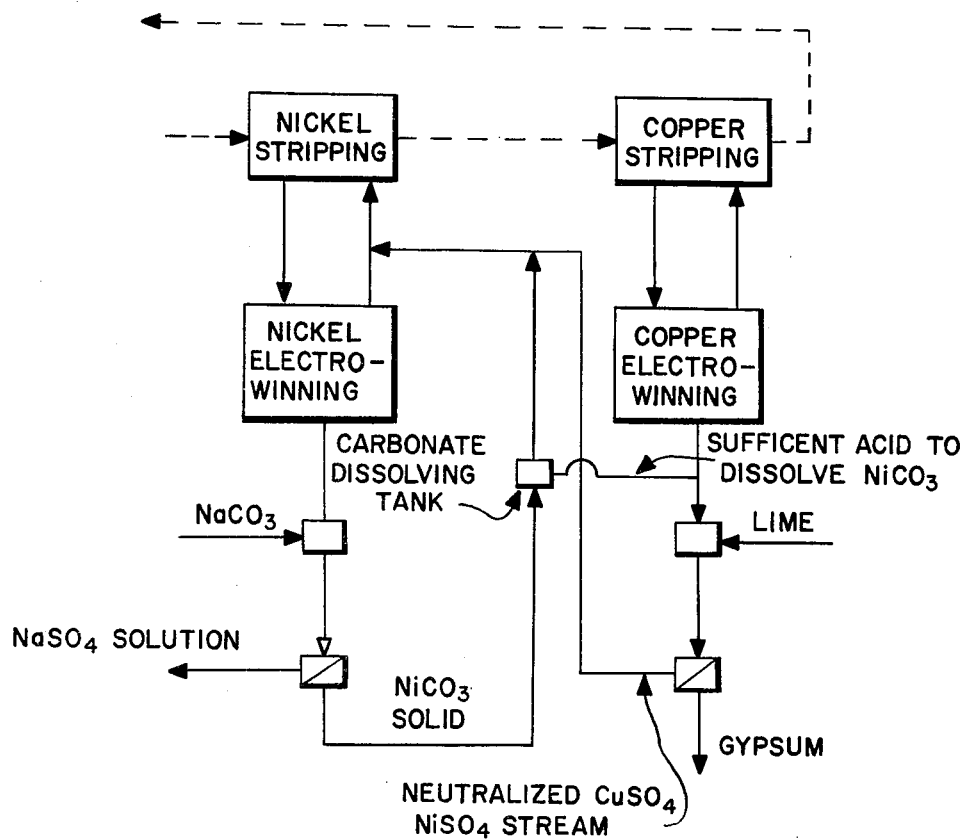
FIG. 6 is a schematic diagram of a system for neutralizing bleed stream.
Figure 7:
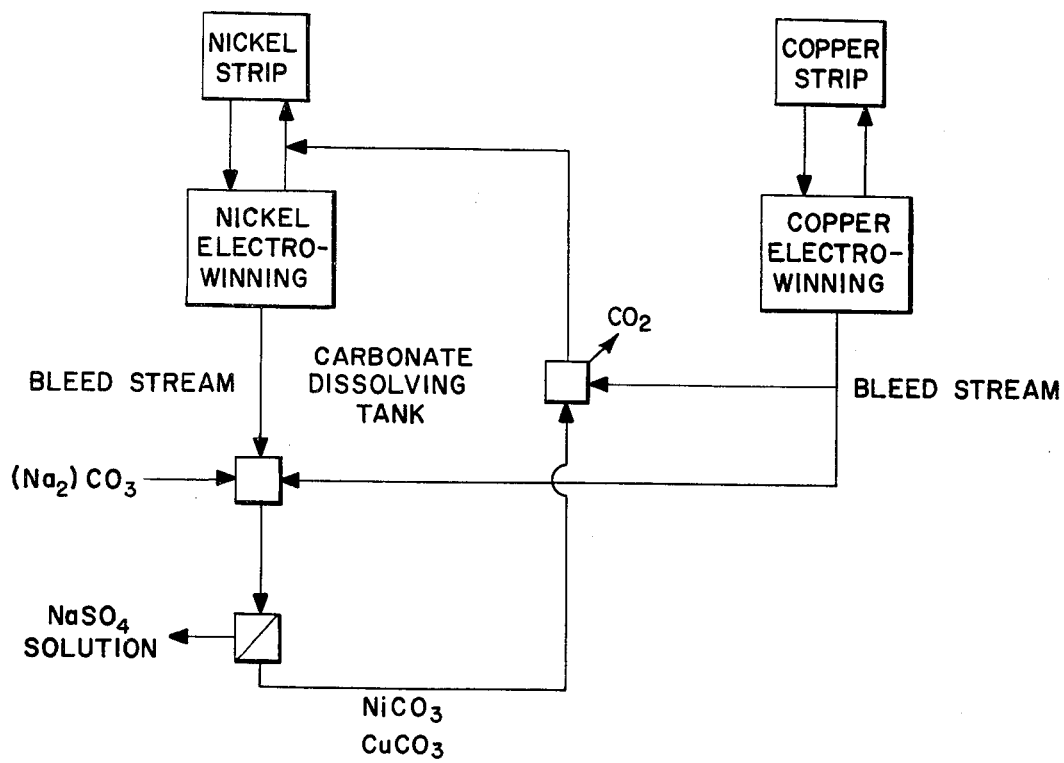
FIG. 7 is a schematic diagram of another system for neutralizing bleed streams.

Of course, if it is desirable to add large quantities of acidic bleed streams to ammoniacal liquor, then it may be desirable to neutralize the bleed stream. Examples of neutralization schemes are shown in FIGS. 6 and 7. As is shown in FIG. 6, the acid bleed stream from a nickel electrowinning is neutralized with sodium carbonate. This has the effect of neutralizing sulfuric acid as a sodium sulfate solution which may be added to preceeding stages in accordance with the procedure set forth above. The carbonate has the effect of precipitating nickel as a solid. The solid nickel carbonate may be dissolved with acid from the copper electrowinning bleed stream. The remaining acid from the copper electrowinning bleed stream may be neutralized with lime to precipitate gypsum.

Alternatively, the copper electrolyte bleed stream can be partially neutralized with sodium hydroxide leaving only sufficient acid to dissolve a nickel carbonate and fill nickel electrowinning acid make up requirements. This procedure uses a more costly hydroxide source, but eliminates gypsum separation. In both cases, make up sulfuric acid is necessary and copper electrolyte to close the $SO_4^-$ balance.

Still another alternative is to neutralize most of the copper electrolyte bleed stream with additional sodium carbonate (in the nickel electrolyte bleed processing) and precipitate copper carbonate as shown in FIG. 7. Then the mixed nickel carbonate, copper carbonate would be dissolved with a small portion of the copper electrolyte bleed. This alternative uses more sodium carbonate, but is simple. In all alternatives it must be realized that copper added to nickel electrolyte will be effectively the same thing as acid in the reaction with the hydrogen ion exchanger. Therefore, the total input of copper, nickel and acid must not exceed the bleed stream total of copper, nickel and acid. The foregoing schemes can, of course, be used to recycle nickel and/or copper bleed streams to secondary ammonia scrub plants and to the pregnant liquor.

At this point, it is emphasized that there is no intention to limit the invention to situations where only copper and nickel are coextracted. As would be apparent to anyone skilled in this art, the invention has applicability to any extraction process in which two or more metals are coextracted and are held onto the extractant by varying degrees of attraction. Copper and nickel on an oxime is a good example of this principle. Thus, when copper and nickel are coextracted by an oxime, the copper is more tightly held onto the oxime than the nickel. Thus, the copper and nickel can be selectively stripped. However, the bleed stream cascade described in this specification is applicable in general to all multiple coextraction circuits. Thus, the broad aspect of the invention includes cascading a bleed stream from the reduction circuit of the most tightly bonded element to other stages. Of course, the most tightly bonded element would be stripped last. Thus, a bleed stream can be provided from the reduction circuit for recovering the most tightly bonded element to the reduction circuit for the next most tightly bonded element right back to the metal extraction stage or to any stage prior to the metal stripping stage. Furthermore, the principle applies to both acid and basic circuits and indeed to processes in which more than two elements are coextracted. For example, in the extraction of rare earths, dozens of elements may be extracted in a single circuit.

Thus, the invention may be embodied in other specific forms without departing from the spirit or essential characteristics thereof; the present embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A process for recovering copper and nickel from a copper and nickel rich aqueous leach liquor containing dissolved metallic impurities, said process comprising the steps of feeding the liquor to an extraction stage wherein the copper and nickel values are extracted with an organic extractant which preferentially but not exclusively takes up copper and nickel from the liquor, in a nickel recovery circuit, selectively stripping nickel from the extractant at a temperature between the range of 40°-55° C. with a first acid solution, electrowinning nickel from the acid solution, and recirculating the nickel-depleted acid solution to strip more nickel, in a copper recovery circuit, stripping copper metal values from the extractant with a second acid solution, electrowinning copper from the second acid solution, and recirculating the copper-depleted second acid solution to strip more copper metal values, preventing the build-up of impurities in the copper electrowinning circuit and preventing the build-up of impurities in the nickel electrowinning circuits by taking a bleed stream from both said circuits and feeding the bleed stream solutions to a stage prior to the metal stripping stages so that the build-up of impurities in the system beyond a predetermined level is prevented.

2. The process as set forth in claim 1 wherein the bleed stream taken from said copper electrowinning circuit is fed to the recirculating nickel-depleted solution passing between the nickel electrowinning stage and the nickel stripping stage, and a bleed stream is taken from the nickel electrowinning circuit and is delivered to said extraction stage.

3. The process as set forth in claim 2 wherein the flow rate ratio between the copper and nickel rich liquor and the bleed stream solutions entering the extraction stage is on the order of 100 to 1.

4. The process as set forth in claim 3 wherein the nickel recovery circuit includes a plurality of nickel stripping stages.

5. The process as set forth in claim 4 wherein the nickel content in the copper recovery circuit is maintained below about 10 grams per liter.

6. The process as set forth in claim 2 wherein the copper and nickel rich liquor is an ammoniacal liquor, said process including the further step of scrubbing ammonia from the nickel and copper loaded oxime.

7. A process for recovering two or more metal values from an aqueous leach liquor with an organic extractant which maintains the metal values on the extractant to different degrees, said process comprising the steps of:

feeding the liquor containing metal values to be extracted to an extraction stage wherein two or more metal values are extracted with an organic extractant which takes up the desired metals and unwanted impurities, in a first recovery circuit selectively stripping the least tightly held metal value from the extractant with a first stripping solution at a temperature between the range of 40°-55° C. and reducing the first metal from the stripping solution to its elemental form and recirculating the first metal depleted solution to strip more of the first metal, in a second metal recovery circuit stripping a second metal value which was coextracted in the extraction stage which second metal value is more tightly bonded to the extractant than said first metal value reducing said second metal value from the stripped solution and recirculating the said metal value depleted strip solution to strip more of the second metal values, preventing the build up of impurities in the metal reduction circuits by diverting a bleed stream of the stripping solution from the most tightly held second metal to the reduction circuit of the metal which was stripped in the preceeding circuit, taking a bleed stream from the metal which was stripped in the preceeding circuit and diverting that bleed stream to the metal extraction circuit to prevent the build up of impurities in the system beyond a predetermined level.

8. A process for recovering copper and nickel from a copper and nickel rich ammoniacal aqueous leach liquor containing dissolved metallic impurities, said process comprising the steps of:

feeding the aqueous leach liquor to an extraction stage wherein copper, nickel and ammonia values are extracted by the organic extractant, delivering the organic extractants to an ammonia scrub stage wherein ammonia is removed from the extractant, delivering the ammonia depleted organic extractant to a nickel recovery circuit wherein nickel is stripped from the extractant with an acid solution at a temperature between the range of 40°–55° C. and nickel is electrowon from the acid solution and the nickel depleted acid solution from the electrowinning circuit is recirculated to strip more nickel from the extractant, delivering the nickel depleted organic extractant to a copper recovery circuit wherein copper values are stripped from the extractant with an acid solution the copper values are electrowon from the acid solution and the copper depleted acid solution from electrowinning is recycled to strip more copper values, diverting a copper depleted acid solution to the nickel recovery circuit, diverting a nickel depleted acid solution from the nickel recovery circuit to the ammonia scrub circuit and diverting an ammonia depleted bleed stream from the ammonia scrub circuit to the metal extraction circuit.

* * * * *